(No Model.) 9 Sheets—Sheet 1.
T. J. SHACKELFORD & J. F. MILTONBERGER.
ADJUSTABLE SURGICAL CHAIR.

No. 520,579. Patented May 29, 1894.

Fig. 1.

(No Model.) 9 Sheets—Sheet 4.
T. J. SHACKELFORD & J. F. MILTONBERGER.
ADJUSTABLE SURGICAL CHAIR.

No. 520,579. Patented May 29, 1894.

(No Model.) 9 Sheets—Sheet 5.
T. J. SHACKELFORD & J. F. MILTONBERGER.
ADJUSTABLE SURGICAL CHAIR.

No. 520,579. Patented May 29, 1894.

Witnesses:
Chas. E. Gaylord,
Lute B. Alter.

Inventors:
Tiffin J. Shackelford,
John F. Miltonberger.
By L. B. Coupland & Co.
Att'ys.

THE NATIONAL LITHOGRAPHING COMPANY,
WASHINGTON, D. C.

(No Model.) 9 Sheets—Sheet 6.
T. J. SHACKELFORD & J. F. MILTONBERGER.
ADJUSTABLE SURGICAL CHAIR.

No. 520,579. Patented May 29, 1894.

Witnesses:
Inventors
Tiffin J. Shackelford.
John F. Miltonberger.
By S. B. Coupland & Co.
Attys.

(No Model.) 9 Sheets—Sheet 7.
T. J. SHACKELFORD & J. F. MILTONBERGER.
ADJUSTABLE SURGICAL CHAIR.

No. 520,579. Patented May 29, 1894.

Witnesses:
Inventors.
Tiffin J. Shackelford.
John F. Miltonberger.

(No Model.) 9 Sheets—Sheet 8.
T. J. SHACKELFORD & J. F. MILTONBERGER.
ADJUSTABLE SURGICAL CHAIR.
No. 520,579. Patented May 29, 1894.

Witnesses:

Inventors:
Tiffin J. Shackelford.
John F. Miltonberger.
By L. B. Coupland & Co.
Att'ys.

THE NATIONAL LITHOGRAPHING COMPANY,
WASHINGTON, D. C.

UNITED STATES PATENT OFFICE.

TIFFIN J. SHACKELFORD AND JOHN F. MILTONBERGER, OF WARSAW, INDIANA.

ADJUSTABLE SURGICAL CHAIR.

SPECIFICATION forming part of Letters Patent No. 520,579, dated May 29, 1894.

Application filed November 24, 1893. Serial No. 491,886. (No model.)

*To all whom it may concern:*

Be it known that we, TIFFIN J. SHACKELFORD and JOHN F. MILTONBERGER, citizens of the United States, residing at Warsaw, in the county of Kosciusko and State of Indiana, have invented certain new and useful Improvements in Adjustable Surgical Chairs, of which the following is a full, clear, and exact description, that will enable others to make and use the same, reference being had to the accompanying drawings, forming a part of this specification.

This invention relates to improvements in that class of adjustable chairs that are more especially intended for use in the medical profession, and has for its object to provide a structure of this character that will embody all the features, convertible positions and combinations required either by the special or general practitioner.

A further object has been to so construct and arrange the different parts, both as to the general features and details, that the structure can be quickly and conveniently converted into any of the changeable positions, or combination of positions, or angles while the patient is in the chair.

The adjusting and controlling mechanism is so arranged that the different parts may be securely held at any angle or combination of angles without the least danger. No matter what convertible position the chair is in, it may be freely turned in either direction to obtain a better light or for other purposes. The structure is capable of being converted into many different positions, from that of an easy chair to an extended horizontal position forming a table or couch, or any inclined position. The different positions are not illustrated, as too many drawings would be required. The mechanism employed to effect the many changes is however fully shown.

In the drawings, A represents a separable supporting-base or pedestal, B the chair-frame, C the chair-seat frame, D the back, and E a stationary pivot and guide-post, on which the chair is raised, lowered and rotated.

Figure 1:
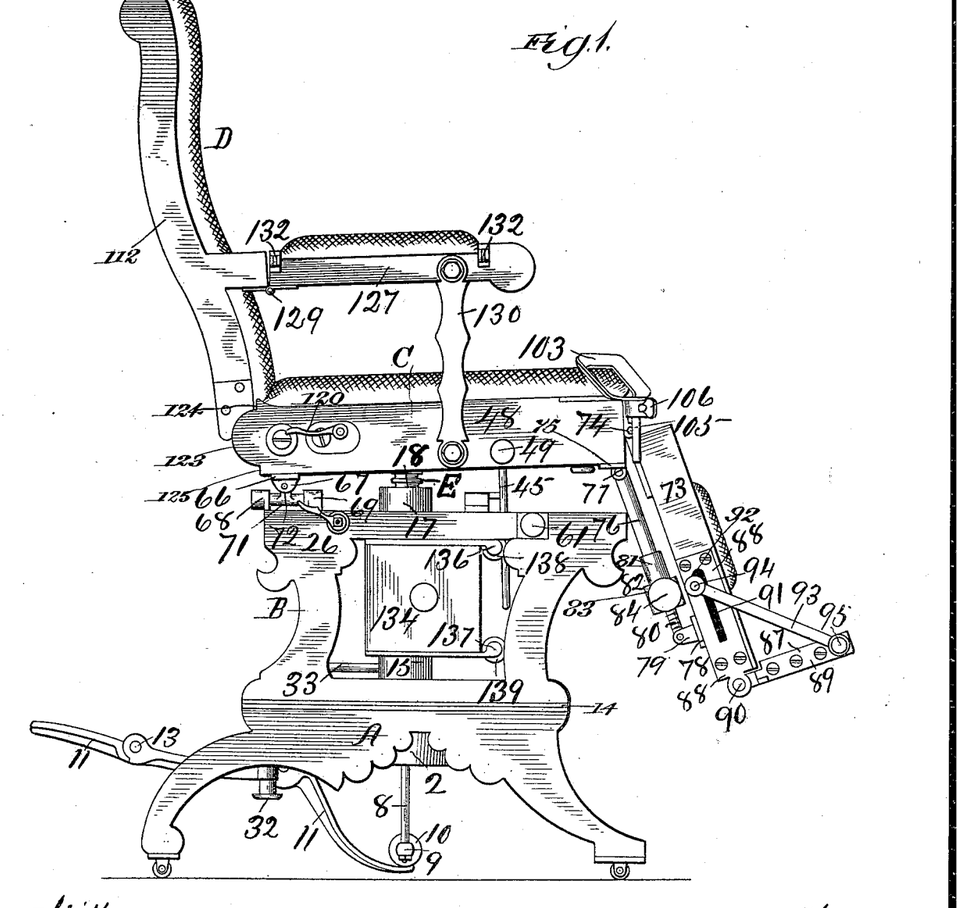
Figure 1 is a side elevation of a chair-structure embodying our improved features.
Figures 2, 8:
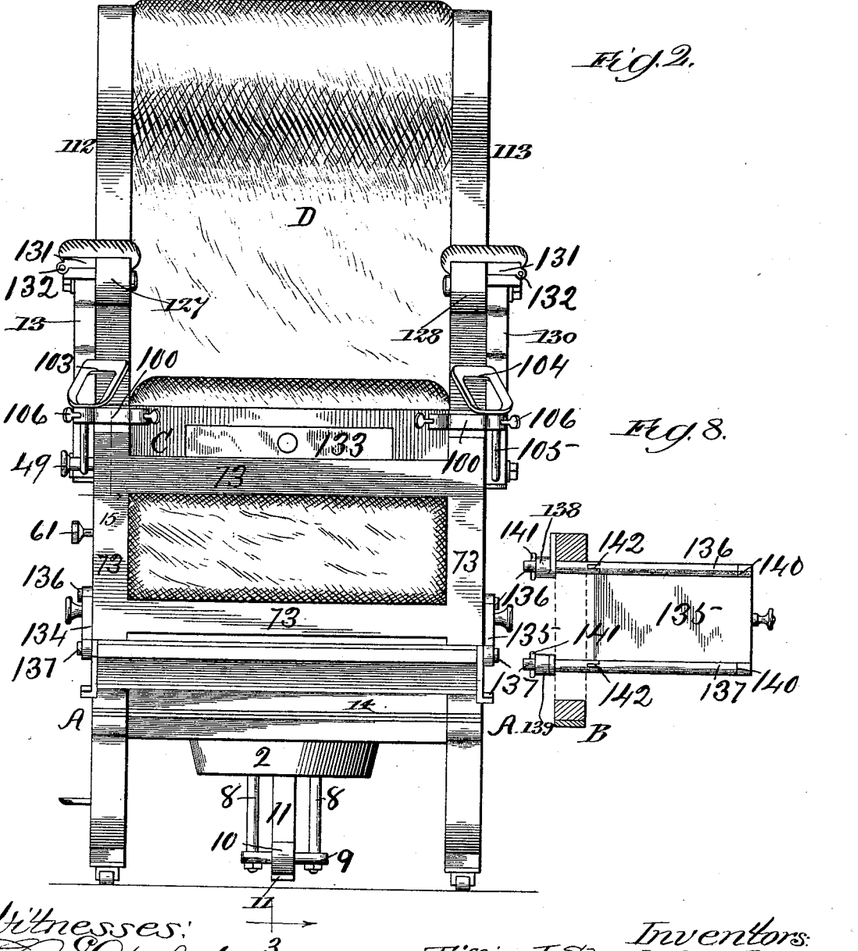
Fig. 2, a front elevation.
Fig. 8, (Sheet 2) is a section on line 8, Fig. 7, showing a side elevation of a sliding and swinging case in its closed position.
Figure 3:
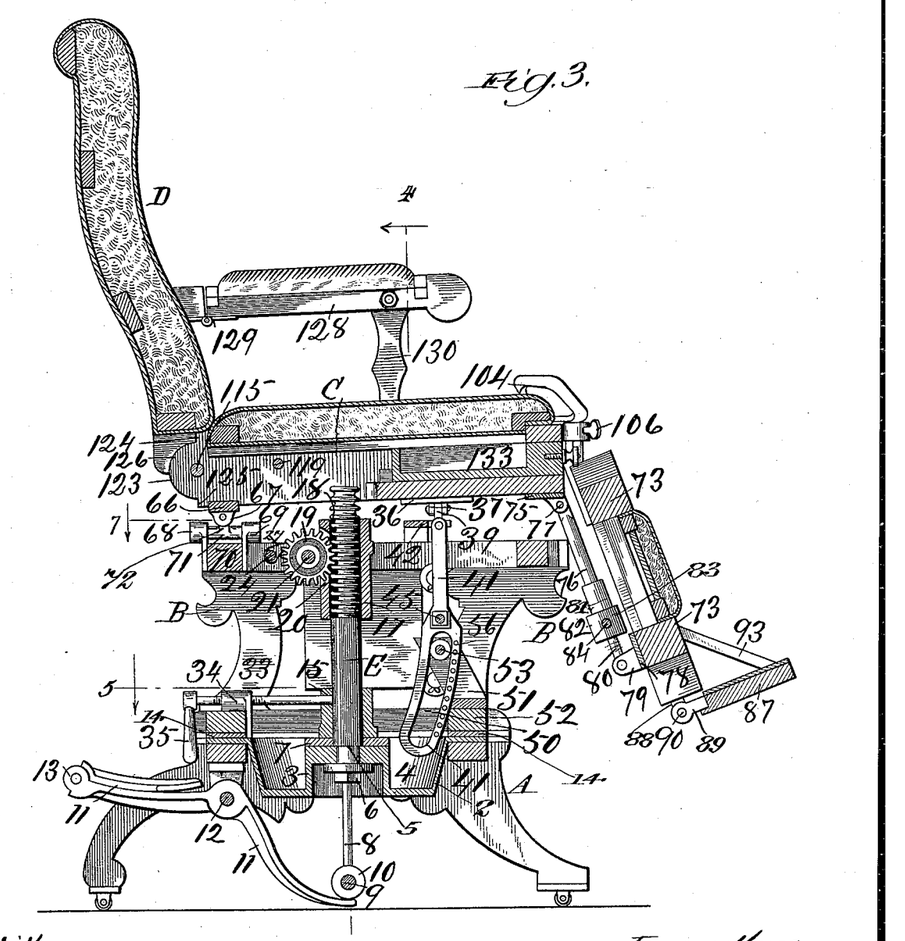
Fig. 3, a vertical longitudinal section on line 3, Fig. 2, looking in the direction indicated by the arrow.

The base is provided with a downward extension or depression 2 (Figs. 1, 2, 3, 4 and 6) having the central raised hub 3 and the surrounding recess or chamber 4. The lower part of pivot-post E has a shoulder-stop 5 formed thereon, which rests on the top of hub 3. The lower end of the post extends through to the under side of this hub, and is locked rigidly in place by a clamping-nut 6. An annular lift-plate 7 is loosely mounted on the pivot-post and when the chair is in its lowermost position, (as illustrated) this plate rests on the top of hub 3. The upper ends of two companion lift-rods 8 are fixed in the lifting-plate 7, and the lower ends rigidly secured in the respective ends of cross-bar 9, on which is loosely mounted a friction-roller 10, which normally rests on the inner curved end (Figs. 1 and 3) of a lifting or foot-lever 11. This lever is provided near its longitudinal center with the fulcrum-bearing 12, and extends outwardly to a convenient position at the rear side of the base. The foot or treadle end of this lever is in two parts or sections and joined together by a pivot-bearing 13, so that the outer or foot-part may be folded over and shortened so as to be out of the way when not in use, as shown in Fig. 3.

Figure 26:
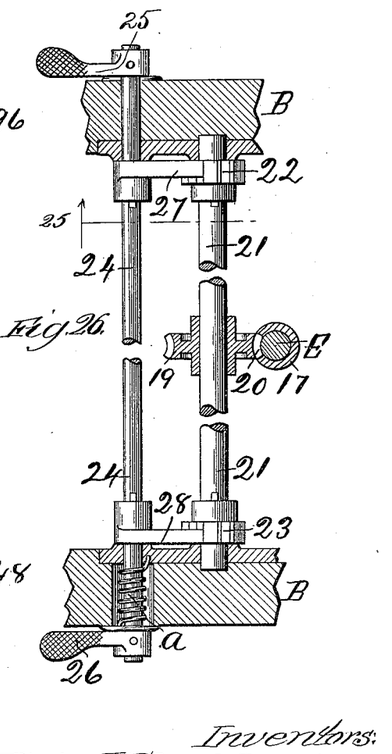
Fig. 26, a horizontal section on line 26, Fig. 25, showing both sides of the chair frame.

A cross-bar 14 has its respective ends secured to the lower part of the chair-frame and is provided centrally with a bearing-collar 15 loosely embracing the pivot-post. This collar seats loosely on lifting-plate 7, so that the chair may be freely revolved in either direction without reference to the elevating mechanism; collar 15 having both a rotary and vertical movement on the pivot-post. A second cross-bar 16 also has its ends secured in the respective sides of the chair-frame at the top and provided with a guide-sleeve 17 inclosing the upper part of pivot-post E, which is provided with a number of annular grooves 18 for the engagement of pinion-wheel 19 through openings 20 in said sleeve. This pinion-wheel is rigidly mounted on shaft 21 having its ends (Figs. 3, 7, 25 and 26) journaled in the respective sides of the chair-frame. On the ends of shaft 21 are mounted ratchet-wheels 22 and 23. A rod 24 runs parallel with shaft 21 and projects through the frame of the chair at each side, and has thumb-plates 25 and 26 mounted on the respective ends thereof. On this rod and just inside of the frame are mounted pawls 27 and 28; the loose ends of which are held normally in engagement with ratchet-wheels 22 and 23, by means of spring a, Fig. 26. When pressure is applied to the foot-lever the chair is elevated through the medium of rods 8, their cross-bar, the plate, in which the upper ends of said rod are fixed, and the cross-bar and collar resting on the lifting-plate. The upper cross-bar and its guide-sleeve, inclosing the grooved end of the pivot-post, greatly assist in maintaining and supporting the chair in a central position. The friction-roller bearing on the inner upper curved side of the foot-lever lessens the power required in raising the chair by easing the movement of these parts. The pawls engaging with the ratchet-wheels on shaft 21, lock the chair at any height to which it is capable of being elevated when the pressure on the foot-lever is relaxed. By pressing on either one of the thumb-plates 25 and 26 the pawls are disengaged from their ratchet-wheels, thus permitting the chair to be lowered.

Figure 9:
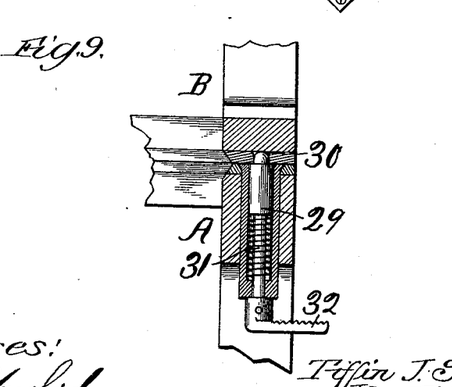
Fig. 9, a broken-away sectional detail on line 9, Fig. 6.

In one corner of the base (Figs. 6 and 9) is located a vertical locking-bolt 29, the upper end of which engages with recess 30 (Fig. 9) in the under side and corner of the chair-frame. A spiral spring 31 holds said bolt in its normal locking position and locks the chair against being rotated when resting on the base. This bolt only locks the chair from turning when in its lowermost position, as when the chair is elevated at any point above the base it may be revolved freely in either direction. The lower end of bolt 29 is provided with a foot-plate 32; a slight pressure on this plate retracts the bolt and releases it from a locking position so that the chair may also be turned around when resting on its base.

Figure 5:
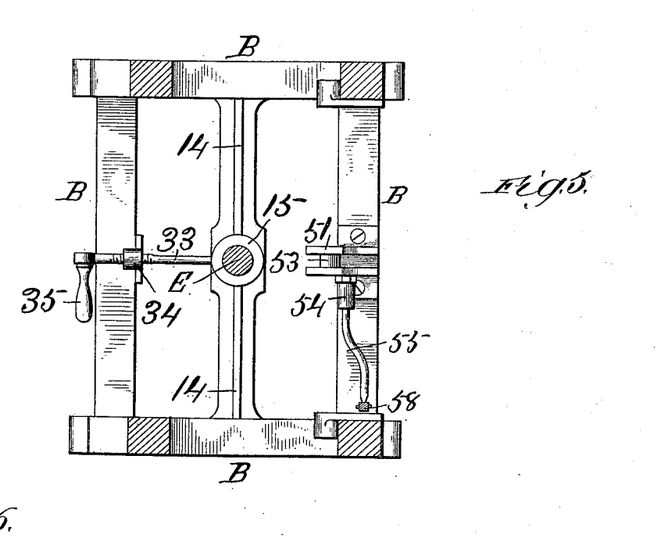
Fig. 5, a horizontal section on line 5, Fig. 3.
Figure 6:
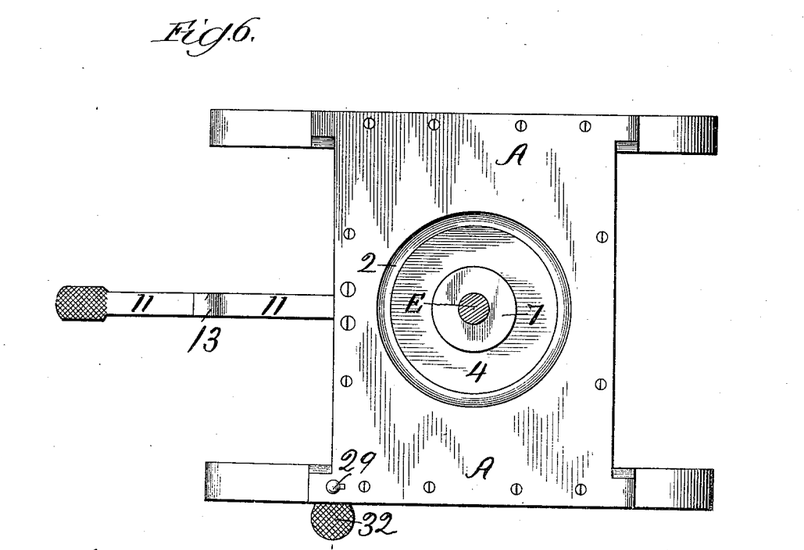
Fig. 6, a plan of the supporting base; the pivot-post being shown in section.

The chair is locked against turning when in an elevated position by means of a locking screw-rod 33 (Figs. 3 and 5) inserted through a threaded bearing 34 fixed to the chair-frame. The inner end of this screw-rod passes through bearing-collar 15 and bears against pivot-post E when in a locking position. The outer end of this screw-rod has a handle, 35, mounted thereon, which provides a means for rotating the same.

Figure 10:
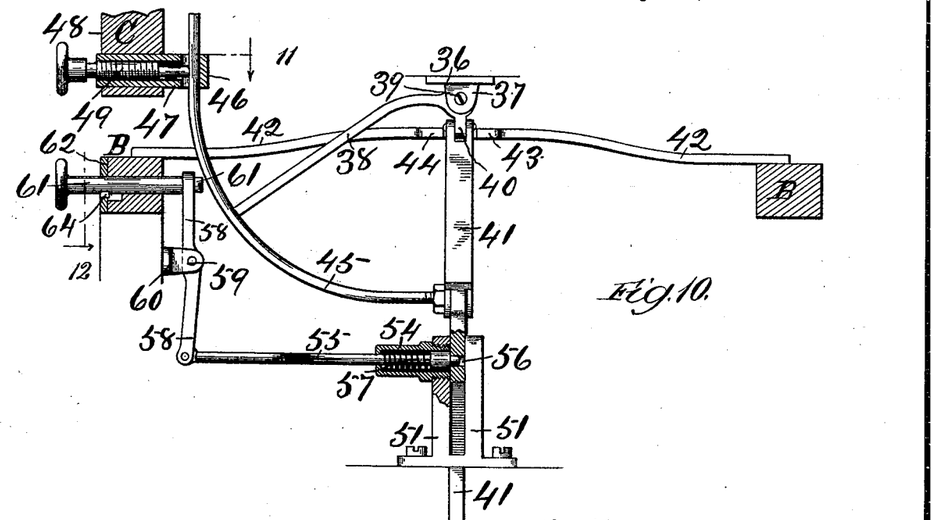
Fig. 10, a diagrammatic view, part elevation and part section, of details of construction.
Figure 11:
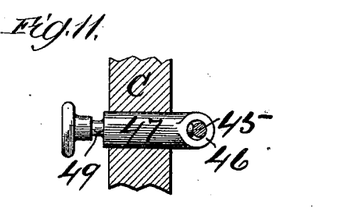
Fig. 11 a broken-away horizontal section and plan, on line 11, Fig. 10.
Figure 12:
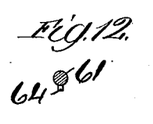
Fig. 12 a transverse section on line 12, Fig. 10.
Figure 13:
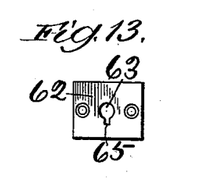
Fig. 13, a detached detail.

To the under side of the seat-frame (Figs. 3 and 10) is attached a plate, 36, provided with lugs, 37, between which is pivoted the upper flat end of a brace-rod 38, as at 39. A lug, 40, projects down from the flat end of this brace to which the upper end of guide-bar 41 is pivoted, thus providing a common pivotal connection for these parts with reference to the seat-frame. A cross-bar 42 has its respective ends secured to the upper part of the chair-frame (Figs. 3, 7 and 10) and is provided with two projecting guide-lugs, 43 and 44, which loosely embrace the edges of guide-bar 41 and prevent a lateral movement thereof. The lower inner end of a curved radius-rod, 45, is rigidly secured to guide-bar 41 near its longitudinal center; the upper undetached end passing up through guide-lug 46, formed on the inner end of sleeve 47 fixed in side-bar 48 of the seat-frame. A clamping-screw 49 (Figs. 1, 10 and 11) has a threaded engagement in said sleeve and bears against the curved rod 45. The stiffening brace-rod 38 has its lower end rigidly secured to the curved rod 45. This arrangement provides for the lateral tilting movement of the chair in the direction of either side, and is locked at any point by means of screw-bolt 49 clamping the curved rod 45. The lower undetached part of guide-bar 41 is provided with a curved slot 50 (Fig. 3) and extends down between the two parts of a bifurcated guide-bracket, 51, rigidly secured to the lower front cross-bar 52 of the chair-frame. A friction-roller 53 is journaled in said bracket and engages with the curved slot in guide-bar 41, to ease and facilitate the longitudinal tilting movement of the chair in elevating the feet and lowering the head, or the opposite, and also to provide for the rocking or pumping action sometimes required when administering an anæsthetic. When the chair is in its normal position the lower slotted end of guide-bar 41 extends down into recess or chamber 4 (Fig. 3) in the base out of the way, so as not to interfere with the turning of the chair. A sleeve 54 (Fig. 10) has one end secured in bracket 51 and incloses one end of locking-rod 55, which engages with any one of the series of apertures 56, in the lower part of guide-bar 41, and locks the chair at any point in accordance with the degree of inclination required. A spring 57 is coiled around locking-rod 55 inside of the sleeve 54 and automatically holds the rod in a locked position. The opposite end of rod 55 is pivoted to the lower end of lever 58, as shown in Fig. 10. This lever is provided with fulcrum-bearing 59, in lug 60 secured to the chair-frame. The upper end of lever 58 is attached to the inner end of a hand-stem 61; the connection being such that when said stem is pushed inwardly a corresponding movement is imparted to the joining end of the lever, and also providing for a rotary movement, or a partial turning around of said stem. A plate 62 (Fig. 13) is fastened to the outer side of the frame (Fig. 10) and is provided with aperture 63 through which stem 61 is inserted and extends on through the chair-frame, as shown. A lug 64 (Fig. 12) is formed on stem 61, which, when these parts are in their normal position engages with a notch, 65, in plate 62; the locking-rod being engaged with guide-bar 41. Pushing in on stem 61 has the effect of retracting rod 55 from its locking engagement in the guide-bar 41, and then slightly turning the stem, in either direction, lug 64 is thrown out of line with reference to notch 65 and bears against the inner side of plate 62 and holds rod 55 in its unlocked position, permitting the chair to be freely rocked longitudinally. When it is desired to simply change the longitudinal inclination of the chair, a degree more or less, stem 61 need not, ordinarily, be rotated after being pushed in but held in that position momentarily, the position of the chair changed and the pressure relaxed on stem 61, when rod 55 will be thrown into a locking engagement by its spring. The rear part of the chair-seat also has a supporting pivot, imparting a universal joint action both with reference to the lateral and longitudinal tilting movement; the arrangement being as follows:

A cross-bar 66 (Figs. 1 and 3) is secured to the under side of the seat-frame. This bar is provided, near its longitudinal center, with downwardly projecting lugs 67. The journal or pivot-bearings 68 and 69 (Figs. 1, 3 and 7) are secured to the respective edges of the rear upper cross-bar 70 of the chair-frame. A rocking pivot-pin 71 is journaled in said pivot-bearings and is provided with the upwardly projecting lug 72, which is pivoted between lugs 67 formed on cross-bar 66, as shown.

Figure 14:
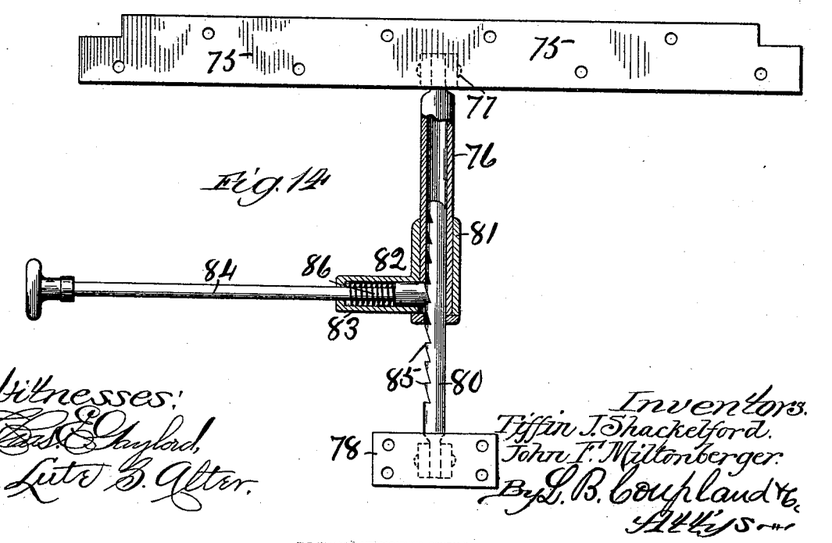
Fig. 14 a diagrammatic view, part plan and part section, of details of construction.
Figure 15:
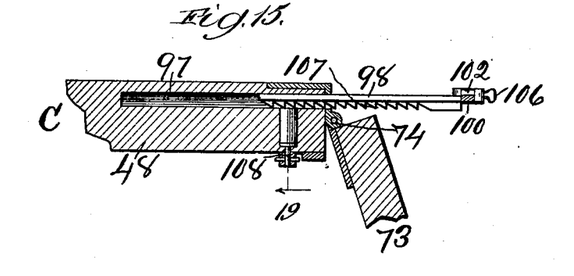
Fig. 15, a broken-away longitudinal section on line 15, Fig. 2.
Figure 16:
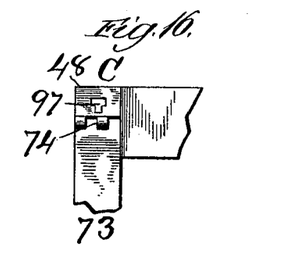
Fig. 16, a broken-away elevation showing the hinged connection between the chair-frame and leg-rest frame.
Figures 17, 18, 19, 20, 21, 22:
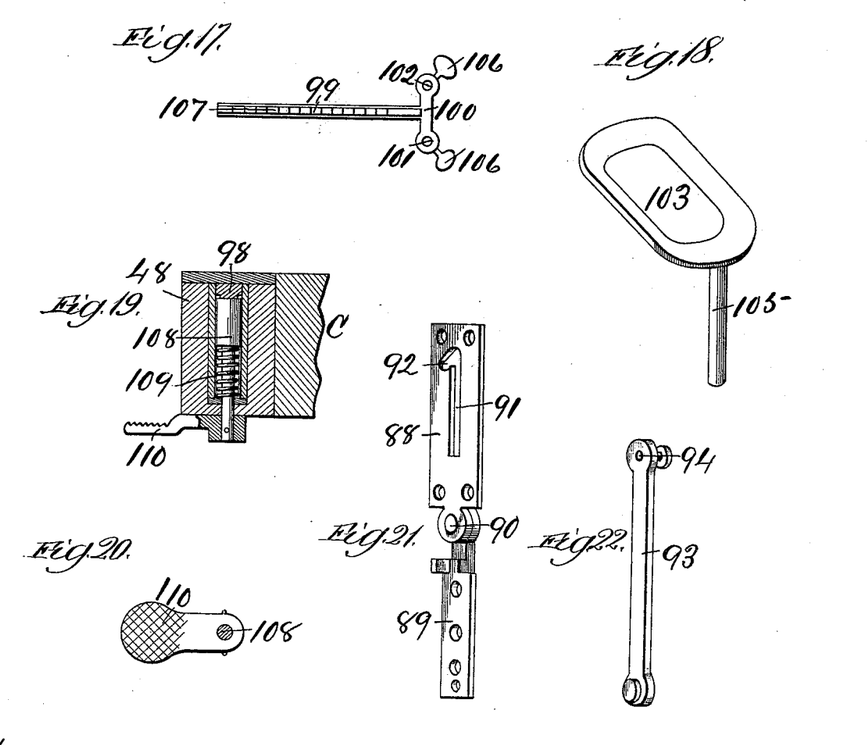
Fig. 17, a detached view of the under side of the foot-stirrup adjusting-bar.
Fig. 18 a perspective of one of the stirrups.
Fig. 19, a broken-away vertical transverse section on line 19, Fig. 15.
Fig. 20, a plan of the thumb-plate shown in Fig. 19; the locking-bolt being in section.
Fig. 21, a view in perspective of plate connections between the leg-rest frame and the foot-rest.
Fig. 22, a perspective of a link used in connection with the plates shown in Fig. 21 for adjustably joining the leg-frame and foot-rest parts.

The leg-rest, foot-rest, and stirrup attachments will next be described. The leg-rest frame, 73, is hinged, as at 74, (Figs. 1, 15 and 16) to the front end of the seat-frame so that it may be raised or lowered as required. A transverse bar 75 (Fig. 14) is secured to the under side of the seat-frame and has one end of a tube, 76, pivoted to the longitudinal center thereof, as at 77. A plate 78, provided with lugs 79, is secured to the under side and lower part of leg-rest. A rack-bar 80 is pivoted at one end to plate 78 and extends into tube 76 and is adapted to have a longitudinal movement therein. The part 81 of angle-sleeve 82, (Fig. 14) embraces the lower end of tube 76; the part 83, extending off at right-angles, incloses the inner end of a hand-locking-rod 84, which engages with ratchet-teeth 85 in rack-bar 80. A spiral-spring 86, coiled on rod 84, inside of its sleeve part, normally retains said rod in its locking position. By this arrangement the leg-rest may be adjusted to any angle or position within the limit of its movement. The leg-rest may be raised to any point without disengaging its locking-rod, but the same must be retracted when lowering it. The foot-rest 87 has a hinged or pivoted connection with the leg-rest and forms an extension thereof and is capable of being adjusted at right-angles thereto or extended in the same plane therewith. The means employed to accomplish this adjustment consists of two hinge-plates 88 (Figs. 1 and 21) secured to the ends of the leg-rest, and the two hinge-plates, 89, secured to the ends of the foot-rest. The plates 88 and 89 are pivoted together on the line between the leg and foot-rest, as shown at 90, thus providing for the hinge-joint action required. The plates 88 are provided with a slot 91 terminating at the upper end in an angle-recess 92. The upper end of an adjustable connecting-link 93 (Fig. 22) has a headed guide-pin, 94, inserted therein; the head-end being on the inside of plates 88 and projecting out through the slot therein, there being space enough between the head of pin 94 and links 93 to receive the edge of plates 88. The lower end of connecting link or links 93 are pivoted to the respective ends of the foot-rest, as at 95. When the foot-rest is in its right-angle position (Fig. 1) with reference to the leg-rest, the guide-pins 94 of links 93 rest in the angle-recess 92 and lock the foot-rest in that position. By pressing on the under side of the links, close up to the upper ends, the guide-pins are disengaged from their locking position and will move down the slots in plates 88, allowing the foot-rest to be lowered to its extended position; the links extending parallel with reference to the leg and foot-rest parts. The side rails 48 and 96, of the seat-frame, are provided, longitudinally, with passages 97, (Figs. 15 and 16) for the reception of companion rack-bars 98 and 99 (Fig. 17) having an endwise movement therein. The projecting head-ends of these bars are provided with a cross-bar 100 having apertures 101 and 102 in the respective ends thereof. The stirrups 103 and 104 (Figs. 2 and 18) are each provided with an attaching stem 105, which is adapted to be inserted in the apertures in the cross-bar 100; the clamping-screws, 106, holding the stirrups in any position or elevation to which they are adjusted. The rack-bars 98 and 99 are provided with teeth 107, with which the inner end of locking-bolt, or bolts, 108 engages. A spring 109 coiled on said bolt, or bolts, holds the same in engagement with the toothed edge of the stirrup rack-bars. The thumb-plate 110, attached to the projecting end of locking-bolts 108, affords means for retracting the same when the rack-bars are to be drawn outward. By having more than one aperture in the cross-bar or head-end of the rack-bars, the stirrups may be set nearer to or farther apart as circumstances may require. By means of the longitudinal adjustment of the rack-bars the relative distance between the chair-seat and stirrups may also be changed as required.

The mechanism employed in the adjustment of the back of the chair, with reference to the seat will next be described.

Figure 23:
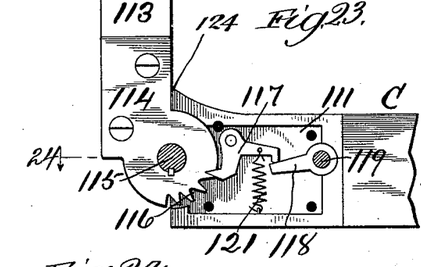
Fig. 23, a broken-away section on line 23, Fig. 24, showing the junction of the back-frame with the bars of the chair-seat frame, looking outwardly from the inside; the cap-plate on that side being removed to show the arrangement of the adjusting and locking-mechanism.
Figure 24:
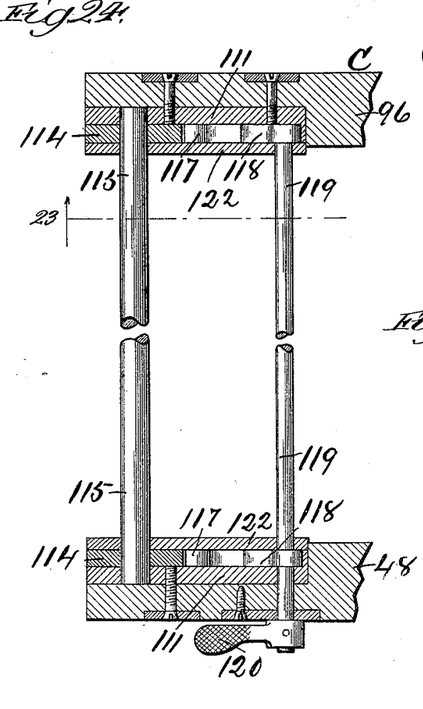
Fig. 24, a horizontal section on line 24, Fig. 23, showing both sides of the chair-seat frame.
Figure 25:
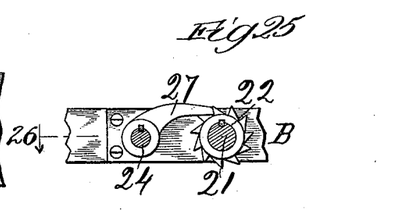
Fig. 25, a broken-away section on line 25, Fig. 26, showing the mechanism used in locking the chair at different elevations.

The rear inner sides of the seat-frame are cut away (Fig. 24) to receive the box-plates 111, rigidly secured in place. To the respective lower ends of the back standards 112 and 113, is secured a pivot-plate 114, having the rounded projecting end (Fig. 23) extending into the box-plates from the rear end and mounted on pivot-shaft 115. The rounded part of the plate, or plates, 114 is provided with a number of teeth, 116, with which one end of pawl 117 engages. The opposite end of pawl 117 rests on a tripping-finger 118, rigidly mounted on the rock-shaft 119 projecting through at one side, and has the thumb-plate 120 mounted thereon. A spring 121 is connected with pawls 117 and normally holds them in an engaged position. When lowering the back of the chair, the pawls are thrown out of engagement by slightly turning rock-shaft 119 by means of its thumb-plate. The pawls, tripping-fingers, and springs are located inside of the box-plates 111, which are closed by removable cap-plates 122. The rear ends of the side-rails are rounded as at 123 (Figs. 1 and 3) and provided on the upper side with stop-shoulder 124 and on the lower side with stop-shoulder 125. The joining surface of the chair-back is correspondingly curved out to form a close fitting bearing, as shown at 126, and when adjusted to the highest or lowest position, shoulders 124 and 125 form a dead-stop and strengthen the structure.

By means of the mechanism described, the chair-back may be adjusted to any angle between its vertical and horizontal position. The rear ends of chair-arms 127 and 128 are hinged to the back standards, as shown at 129 Figs. 1 and 3. The front part of the chair-arms are connected with and supported from the side rails of the seat-frame by bars 130, having their ends pivoted to the chair-arms and seat-frame respectively, so that these parts will conform to any position the chair-back is capable of being adjusted to.

Figure 4:
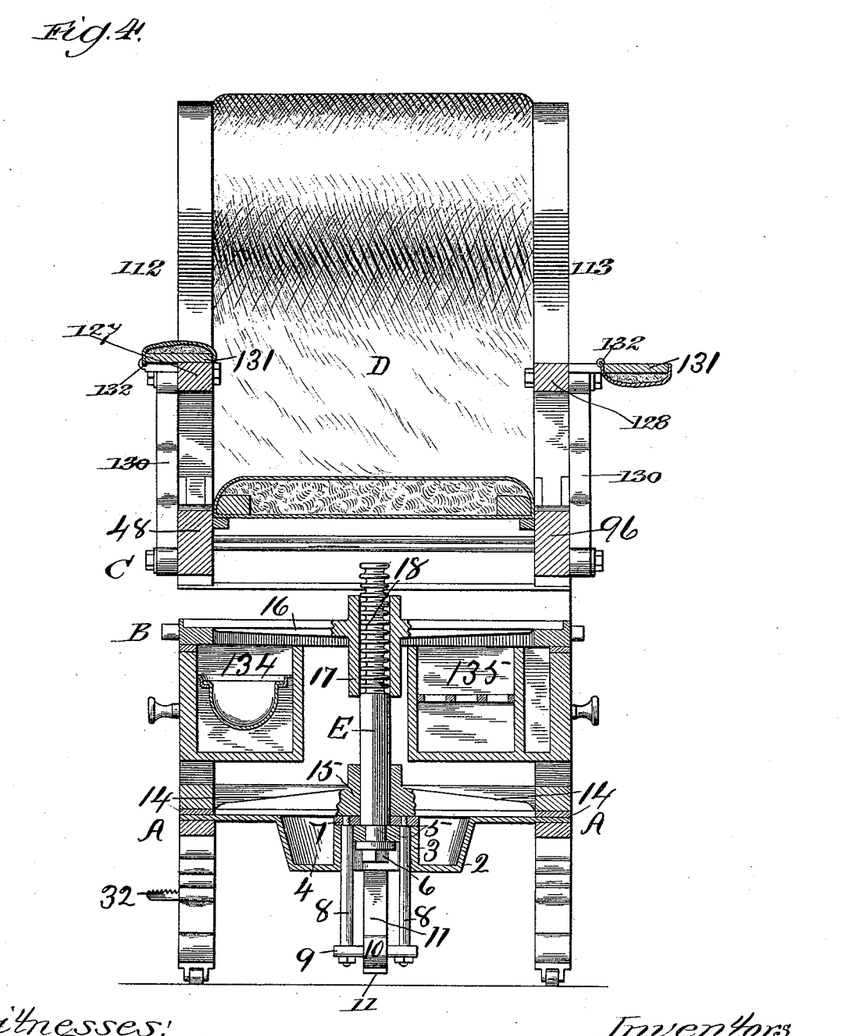
Fig. 4, a vertical transverse section on line 4, Fig. 3.

A leaf 131 is hinged, as at 132, to the chair-arms and adapted to be turned outwardly to the position shown in Fig. 4, forming a small, convenient table extension to be used more especially when operating on the hand or arm. When closed or folded back to their normal position, these leaves form substantially a part of the chair-arms, and are upholstered as shown.

A drawer 133 (Figs. 2 and 3) is inserted in the seat-frame from the front side, and is within convenient reach of the operator when seated in front of the chair. This drawer may be used as a convenient receptable for instruments, or drawn out and used as an additional shelf-support, or for various other purposes.

Figure 7:
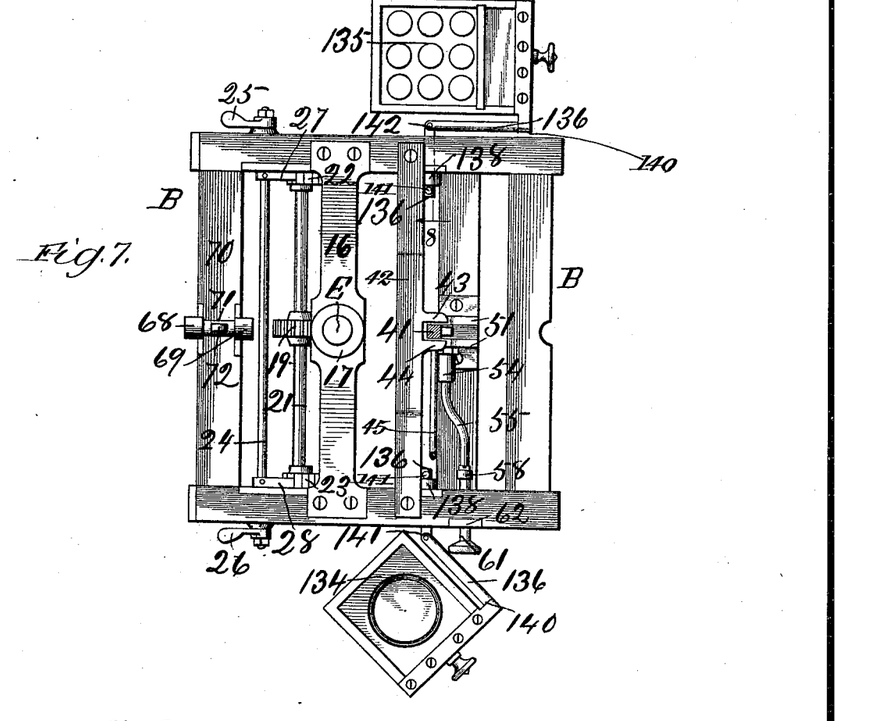
Fig. 7, a horizontal section on line 7, Fig. 3.

The chair-frame is provided at one side (Figs. 1, 4, 7 and 8) with a cuspidor receptacle 134, and on the opposite side with a medicine case 135. These receptacles have both a sliding and a swinging movement; the arrangement being as follows: Two hinge-rods 136 and 137 are supported by, and have a longitudinal movement in bearings 138 and 139 rigidly secured to the chair-frame. The receptacles are mounted on the outer ends of these rods, as shown at 140, the inner end having a stop-pin 141 inserted therethrough (Fig. 8) which limits their outward movement and prevents the rods from becoming disengaged from their bearings. These rods are provided with pivot or hinge-joints 142, so that the receptacles carried thereon may be swung around at right-angles to a convenient position when drawn out far enough to clear the chair-frame, as shown in Fig. 7.

We do not limit ourselves to the precise details of construction and arrangement shown, but may make such changes as will ordinarily come within the province of the mechanic, without departing from the spirit of our invention.

Having thus described our invention, what we claim as new, and desire to secure by Letters Patent, is—

1. In a convertible chair, a base-structure, a hub-part, a pivot-post, provided in its upper part with a number of annular grooves and having its lower end inserted down through said hub or base and rigidly fixed therein, a lifting-plate, loosely mounted on the pivot-post, the companion lift-rods, having their upper ends fixed in the lift-plate, a cross-bar, connecting the lower ends of said rods, a foot-lever, fulcrumed in the base-structure, the chair part, resting on and elevated by the lift-plate and operating-mechanism, and the means described, sustaining the chair in an elevated position, substantially as set forth.

2. In a convertible chair, the combination with the chair part proper, of a base-structure, a lifting foot-lever, fulcrumed therein, a cross-bar, a friction-roller, loosely mounted thereon, the lift-rods, having their lower ends fixed in the respective ends of said cross-bar, a lift-plate, in which the upper ends of said rods are fixed, a pivot or guide-post, and the means described for sustaining the chair in an elevated position, substantially as set forth.

3. In a convertible chair, the combination with the chair part proper, of a base-structure, a pivot or guide-post, fixed therein, a lift-plate loosely embracing said post, the companion lift-rods, having their upper ends fixed in the lift-plate, a cross-bar, connecting the lower ends of the lift-rods, a friction-roller, loosely mounted on said bar, a foot-lever, provided with a suitable fulcrum-bearing, the inner end presenting a curved surface to said roller and the outer end having a pivotal joint and folding over upon itself, and the means described for sustaining the chair in an elevated position, substantially as set forth.

4. In a convertible chair, a supporting-base, a pivot-post, having its lower end fixed in said base, the chair frame, a cross-bar, secured to the chair-frame and provided centrally with a collar loosely embracing the pivot-post, a lift-plate, the lift-rods, the cross-bar, connecting the lower ends of said rods, a lifting foot-lever, and the means described for sustaining the chair in an elevated position, substantially as set forth.

5. In a convertible chair, a pivot-post, having a fixed position and provided with a number of annular grooves, the chair-frame, a cross-bar, having its respective ends secured to the chair-frame and provided centrally with a guide-sleeve, loosely inclosing the grooved part of the pivot-post, a shaft, journaled in the chair-frame, a pinion-wheel, mounted on said shaft and adapted to engage with the grooves in the pivot-post through an opening in said sleeve, ratchet-wheels, mounted on the respective ends of the pinion-shaft, a rod, running parallel to said shaft, the pawls, mounted on said rod and engaging with said ratchet-wheels, and means for rotating said rod for the purpose of throwing the pawl out of engagement, whereby the chair-structure may be locked at any elevation above the base, substantially as set forth.

6. In a convertible chair, the combination of a supporting base, a pivot-post, provided with annular grooves for a part of its length and rigidly secured in the hub-part of said base, a lift-plate, embracing the pivot-post, the rods, extended up through the base and having their upper ends fixed in the lift-plate, a cross-bar, connecting the lower ends of said rods, a lifting or foot-lever, the chair-frame, a cross-bar, secured to the lower part of the chair-frame and provided centrally with a collar loosely inclosing said pivot-post, a cross-bar, secured to the upper part of said frame and provided centrally with a guide-sleeve, loosely inclosing the grooved part of the pivot-post, a shaft, journaled in the chair-frame, a pinion-wheel, mounted on said shaft and adapted to engage with the grooved part of the pivot-post, ratchet-wheels, mounted on the respective ends of the pinion-shaft, a rotatable rod, running parallel to said shaft, the pawls, mounted on said rod and engaging with said ratchet-wheels, whereby the chair may be raised and locked at any elevation, lowered, and revolved at any point between the lowest and highest position, substantially as set forth.

7. In a convertible-chair, the combination of the chair-frame, the seat-frame, the rear pivotal connection, joining the chair and seat frames, a guide-bar, pivoted at its upper end to the under side of the seat-frame, a curved rod, having one end secured to said guide-bar, a sleeve, fixed in the seat-frame and provided on one end with a guide-lug through which the undetached end of said curved rod is inserted, a clamping-screw, having a threaded engagement in said sleeve and bearing against said rod, whereby the seat-frame may be tilted laterally and locked at any angle, substantially as set forth.

8. In a convertible chair, the combination of the chair-frame, the seat-frame, the pivotal connection, joining the chair and seat-frame at the rear, a brace-rod, pivoted at its inner end to the front of the seat-frame, a guide-bar, pivoted at its upper end to a lug formed on said brace-rod, a curved radius-rod, to which the outer end of said brace-rod is secured, and means, substantially as described, for locking the seat-frame with reference to said curved rod, substantially as set forth.

9. In a convertible chair, the combination of the chair-frame, the seat-frame, the rear pivotal connection, joining the chair and seat-frames, a guide-bar, having a pivotal connection with the front part of the seat-frame, a cross-bar, having its respective ends secured to the chair-frame and provided with guide-lugs which loosely embrace the edges of the guide-bar, a guide-bracket, rigidly secured to the chair-frame, a curved radius-rod, secured at its lower end to the guide-bar, the upper end extending up through one side of the seat-frame, a clamping-screw, engaging with the radius-rod, a brace-rod, and means, substantially as described, for locking said guide-bar in any position to which it is capable of being adjusted, substantially as set forth.

10. In a convertible-chair, the combination of the chair-frame, the seat-frame, the rear pivotal connection joining the chair and seat frame, a guide-bar, pivoted at its upper end to the under side and front part of the seat-frame and provided in its lower end with a curved slot, a guide-bracket secured to the chair-frame, a friction-roller, journaled in said bracket and working in the slotted end of said guide-bar, and the locking-rod, adapted to engage with the guide-bar, whereby the chair part may be rocked longitudinally, substantially as set forth.

11. In a convertible-chair, the combination of the tilting seat-frame, a guide-bar, pivoted at its upper end to said seat-frame, the lower end being slotted and provided with a series of apertures, the chair-frame, a bifurcated bracket, rigidly secured to the lower part of the chair-frame and guiding the movement of said guide-bar, a friction-roller, journaled in said bracket and engaging with the slotted part of the guide-bar, a sleeve, secured in said bracket, a locking-rod, extending in through said sleeve and adapted to engage with the apertures in the guide-bar, a lever, provided with a fulcrum-bearing in the chair-frame and connected at one end to the outer end of the locking-rod, and a stem, connected to one end of the fulcrumed lever, whereby said locking-rod may be thrown into and out of engagement with reference to the guide-bar in adjusting the chair, substantially as set forth.

12. In a convertible-chair, the combination of the chair-frame, the seat-frame, the pivotal connection, joining the chair and seat frame at the rear, a guide-bar, having apertures in the lower part thereof and pivoted at its upper end to the seat-frame, a bifurcated bracket, rigidly secured to the chair-frame and loosely embracing the lower end of said guide-bar, a friction-roller, journaled in said bracket and engaging with the slotted end of said guide-bar, a sleeve, secured in said bracket, a locking-rod, inserted through said sleeve and engaging with the apertures in the guide-bar, and a spring inclosed by said sleeve and coiled on the rod passing therethrough, whereby the latter is held normally in a locked position, substantially as set forth.

13. In a convertible-chair, the combination of the chair-frame, the seat-frame, the pivotal connection, joining the chair and seat frame, a plate, secured to the chair-frame and provided with an aperture, and a notch opening into said aperture, a hand-stem, inserted through the chair-frame and plate and provided with a lug adapted to engage with the notch in said plate in one position, a fulcrumed lever, to one end of which said hand-stem is connected, a locking-rod, connected at one end to the opposite end of said lever, a bifurcated bracket, rigidly secured to the chair-frame, a sleeve, inserted in said bracket, a spring, coiled on said locking-rod inside of said sleeve, a guide-bar, pivoted at its upper end to the seat-frame and provided in the lower part, loosely embraced by said bracket, with a number of apertures with which the inner end of the locking-rod is adapted to engage in locking said guide-bar in the different positions to which it is capable of being adjusted, and a friction-roller, journaled in said bracket and engaging with the slotted end of the guide-bar, substantially as set forth.

14. In a convertible-chair, the combination of the seat-frame, a cross-bar, provided with projecting lugs and secured to said frame, the chair-frame, the journal or pivot-bearings, secured thereto, a rocking pivot-pin, journaled in said bearings and provided with a lug pivotally connecting with the lugs on the cross-bar secured to the seat-frame, a guide-bar, pivoted at its upper end to the under side and front part of the seat-frame, a curved rod, having one end secured to said guide-bar, a sleeve, fixed in the seat-frame and provided on one end with a guide-lug through which the undetached end of said curved rod is inserted, a clamping-screw, having a threaded engagement in said sleeve and bearing against said curved rod, a bifurcated bracket, rigidly secured to the chair-frame and loosely embracing the lower part of the guide-bar, and means, substantially as described, for locking said bar in place with reference to said bracket whereby the seat-frame may be tilted laterally and longitudinally, and locked at any angle, substantially as set forth.

15. In a convertible chair, the combination of the seat-frame, the leg-rest, hinged thereto, a tube, pivoted at one end to said frame, a rack-bar, pivoted at one end to the leg-rest and extending into the tubular connection of the seat-frame, an angle-sleeve, embracing one end of said tube, a hand locking-rod, inserted through the angle-part of said sleeve and engaging with said rack-bar, and a spring, coiled on said rod and normally holding the same in a locked position, substantially as and for the purpose set forth.

16. In a convertible-chair, the combination of the seat-frame, the leg-rest, having a hinged connection therewith, a transverse-bar, secured to the under side of the seat-frame, a tube, pivoted at one end to said bar, a rack-bar, pivoted at one end to the leg-rest and loosely inserted in said tube, an angle-sleeve, embracing one end of said tube, a locking-rod, inserted through said sleeve and bearing against the rack-bar, the hinged-plates, provided with slots ending in angular recesses and secured to the leg-rest, the foot-rest extension, the hinged connection, joining the leg and foot rest, and the connecting links, pivoted at one end to the respective ends of the foot-rest, the opposite ends of said links adjustably engaging with the slotted plates of the leg-rest, substantially as set forth.

17. In a convertible chair, the combination with the side rails of the seat-frame, of the companion box-plates, the back-standards, the pivot-plates, secured to said standards and having rounded toothed ends projecting into said box-plates, the pivot-shaft, the pawls, engaging with the toothed surface of said pivot-plates, the tripping-fingers, for disengaging said pawls, the rock-shaft, on which said fingers are mounted, and the spring, retaining said pawls in their engaged position, substantially as set forth.

TIFFIN J. SHACKELFORD.
JOHN F. MILTONBERGER.

Witnesses:
JOHN D. WIDAMAN,
HARVEY W. UPSON.